US010688426B2

(12) United States Patent
Peck et al.

(10) Patent No.: US 10,688,426 B2
(45) Date of Patent: Jun. 23, 2020

(54) METHODS AND APPARATUSES FOR SEPARATING LIQUID PARTICLES FROM A GAS-LIQUID STREAM

(71) Applicant: CUMMINS FILTRATION IP, INC., Columbus, IN (US)

(72) Inventors: Lee A. Peck, Stoughton, WI (US); Peter K. Herman, Stoughton, WI (US); Arun Janakiraman, Stoughton, WI (US); Benjamin L. Scheckel, Stoughton, WI (US); Navin K. Surana, Pune (IN)

(73) Assignee: Cummins Filtration IP, Inc., Columbus, IN (US)

( * ) Notice: Subject to any disclaimer, the term of this patent is extended or adjusted under 35 U.S.C. 154(b) by 186 days.

(21) Appl. No.: 15/618,300

(22) Filed: Jun. 9, 2017

(65) Prior Publication Data
US 2017/0274306 A1 Sep. 28, 2017

Related U.S. Application Data

(62) Division of application No. 13/954,126, filed on Jul. 30, 2013, now Pat. No. 9,737,835.
(Continued)

(51) Int. Cl.
*B01D 45/12* (2006.01)
*B01D 45/08* (2006.01)
(Continued)

(52) U.S. Cl.
CPC ............. *B01D 45/08* (2013.01); *B01D 45/16* (2013.01); *B01D 46/002* (2013.01);
(Continued)

(58) Field of Classification Search
CPC .. B01D 45/08; B01D 46/0086; B01D 46/521; B01D 46/002; B01D 46/0023; B01D 45/16; C04B 35/565
See application file for complete search history.

(56) References Cited

U.S. PATENT DOCUMENTS 1,637,697 A * 8/1927 Jacobsen ............... B01F 5/0644
137/599.12
1,778,790 A * 10/1930 Brandl ..................... F02M 1/00
138/37
(Continued)

FOREIGN PATENT DOCUMENTS

CN 201565207 9/2010
CN 201692732 1/2011
(Continued)

OTHER PUBLICATIONS

First Office Action and Search Report issued for Chinese Patent Application No. 201380035508.9, dated Sep. 9, 2016, 9 pages.
(Continued)

*Primary Examiner* — Dung H Bui
(74) *Attorney, Agent, or Firm* — Foley & Lardner LLP

(57) ABSTRACT

A gas-liquid separator comprises a housing having an inlet for receiving a gas-liquid stream and an outlet for discharging a gas stream. An impactor nozzle structure is supported by the housing and situated downstream of the inlet. The impactor nozzle structure receives the gas-liquid stream and accelerates the gas-liquid stream through an orifice that extends through the impactor nozzle structure. An impaction surface is supported by the housing and situated downstream of the orifice. The impaction surface receives the accelerated gas-liquid stream and causes separation of liquid particles from the gas-liquid stream so as to produce the gas stream, and a baffle situated downstream of the impaction surface modifies a flow of the gas stream so as to reduce carryover
(Continued)

of liquid particles in the gas stream. A shroud tier an inertial impactor gas-liquid separator is disclosed. A method for separating liquid particles from a gas-liquid stream is disclosed.

16 Claims, 10 Drawing Sheets

Related U.S. Application Data

(60) Provisional application No. 61/677,530, filed on Jul. 31, 2012.

(51) Int. Cl.
*B01D 46/00* (2006.01)
*B01D 46/52* (2006.01)
*B01D 45/16* (2006.01)
*C04B 35/565* (2006.01)

(52) U.S. Cl.
CPC ..... *B01D 46/0023* (2013.01); *B01D 46/0086* (2013.01); *B01D 46/521* (2013.01); *C04B 35/565* (2013.01)

(56) References Cited

U.S. PATENT DOCUMENTS

| | | | | |
|---|---|---|---|---|
| 2,806,551 | A * | 9/1957 | Heinrich | B04C 3/04 55/340 |
| 3,420,040 | A * | 1/1969 | Neely | B04C 5/06 55/346 |
| 4,271,675 | A * | 6/1981 | Jones | F23R 3/14 239/406 |
| 4,384,035 | A | 5/1983 | Grant et al. | |
| 4,929,088 | A * | 5/1990 | Smith | B01F 5/0473 138/40 |
| 4,981,368 | A * | 1/1991 | Smith | B01F 5/0473 366/337 |
| 6,149,700 | A | 11/2000 | Morgan et al. | |
| 6,290,738 | B1 | 9/2001 | Holm | |
| 6,576,045 | B2 | 6/2003 | Liu et al. | |
| 6,797,040 | B2 | 9/2004 | Lenzing | |
| 7,040,802 | B2 * | 5/2006 | Fuglister | B01F 5/0618 366/337 |
| 7,473,291 | B2 | 1/2009 | Evenstad et al. | |
| 7,581,387 | B2 * | 9/2009 | Bui | F01N 3/101 60/274 |
| 7,614,390 | B2 | 11/2009 | Holzmann et al. | |
| 7,637,978 | B2 * | 12/2009 | Jung | F02M 35/022 55/396 |
| 7,678,169 | B1 | 3/2010 | Gwin et al. | |
| 7,850,754 | B2 | 12/2010 | Ruppel et al. | |
| 7,870,850 | B2 | 1/2011 | Herman et al. | |
| 7,935,165 | B2 | 5/2011 | Faber et al. | |
| 7,964,009 | B2 | 6/2011 | Herman et al. | |
| 8,047,186 | B2 | 11/2011 | Shieh et al. | |
| 8,075,654 | B2 | 12/2011 | Holzmann et al. | |
| 8,118,909 | B2 | 2/2012 | Faber et al. | |
| 8,141,353 | B2 * | 3/2012 | Zheng | B01F 3/04049 60/324 |
| 8,152,884 | B1 | 4/2012 | Severance et al. | |
| 8,241,411 | B2 | 8/2012 | Faber et al. | |
| 9,410,464 | B2 * | 8/2016 | Hicks | F01N 3/2066 |
| 2006/0124117 | A1 | 6/2006 | Knauf et al. | |
| 2007/0175186 | A1 | 8/2007 | Braziunas | |
| 2007/0204751 | A1 * | 9/2007 | Wirth | B01F 3/04049 96/290 |
| 2008/0110339 | A1 | 5/2008 | Kwok et al. | |
| 2008/0307780 | A1 * | 12/2008 | Iverson | F01N 3/025 60/311 |
| 2009/0019843 | A1 * | 1/2009 | Levin | B01F 3/04049 60/303 |
| 2009/0178395 | A1 * | 7/2009 | Huffmeyer | F01N 3/025 60/297 |
| 2009/0193770 | A1 | 8/2009 | Holzmann et al. | |
| 2009/0241315 | A1 | 10/2009 | Menez et al. | |
| 2009/0255242 | A1 * | 10/2009 | Paterson | B01F 3/02 60/320 |
| 2009/0262599 | A1 * | 10/2009 | Kohrs | B01F 5/0643 366/337 |
| 2010/0089183 | A1 | 4/2010 | Solomon | |
| 2010/0107617 | A1 * | 5/2010 | Kaiser | B01F 3/04049 60/324 |
| 2010/0126479 | A1 | 5/2010 | Shieh et al. | |
| 2010/0218490 | A1 * | 9/2010 | Forster | B01F 5/0451 60/324 |
| 2010/0263359 | A1 * | 10/2010 | Haverkamp | F01N 3/2066 60/303 |
| 2010/0275561 | A1 * | 11/2010 | Lundquist | B04C 3/00 55/456 |
| 2010/0294218 | A1 | 11/2010 | Ruppel et al. | |
| 2011/0036082 | A1 | 2/2011 | Collinot | |
| 2011/0146254 | A1 | 6/2011 | Yi et al. | |
| 2011/0179755 | A1 | 7/2011 | Gruhler et al. | |
| 2011/0205837 | A1 * | 8/2011 | Gentgen | B01F 5/0616 366/337 |
| 2012/0000356 | A1 | 1/2012 | Moredock et al. | |
| 2012/0144788 | A1 | 6/2012 | Faber et al. | |
| 2012/0210697 | A1 | 8/2012 | Garimella et al. | |
| 2012/0318215 | A1 | 12/2012 | Copley | |
| 2013/0056407 | A1 | 3/2013 | Parikh et al. | |
| 2014/0033922 | A1 | 2/2014 | Peck et al. | |

FOREIGN PATENT DOCUMENTS

| | | |
|---|---|---|
| CN | 202237589 | 5/2012 |
| DE | 43 31 684 | 3/1995 |
| JP | 2008-302269 | 12/2008 |
| WO | WO 2010/110935 | 9/2010 |

OTHER PUBLICATIONS

International Search Report and Written Opinion for International Application No. PCT/US2013/052713, dated Feb. 11, 2014, 14 pages.

First Office action cited for Indian patent application No. 9182/CNENP/2014, dated Jan. 17, 2019, pp. 1-7.

* cited by examiner

METHODS AND APPARATUSES FOR SEPARATING LIQUID PARTICLES FROM A GAS-LIQUID STREAM

CROSS REFERENCE TO RELATED APPLICATIONS

This application is a divisional of U.S. patent application Ser. No. 13/954,126, filed Jul. 30, 2013, which claims the benefit of and priority to U.S. Provisional Patent Application Ser. No. 61/677,530, filed Jul. 31, 2012. The contents of both applications are herein incorporated by reference in their entirety.

FIELD

The present disclosure relates to gas-liquid separators and methods for separating liquid panicles from a gas-liquid stream.

BACKGROUND

U.S. Pat. No. 6,290,738, the disclosure of which is hereby incorporated by reference in its entirety, discloses an inertial gas-liquid separator having a housing with an inlet for receiving a gas-liquid stream, and an outlet for discharging a gas stream. A nozzle structure in the housing has a plurality of nozzles receiving the gas-liquid stream from the inlet and accelerating the gas-liquid stream through the nozzles. An inertial collector in the housing in the path of the accelerated gas-liquid stream causes a sharp directional change thereof and in preferred form has a rough porous collection surface causing liquid particle separation from the gas-liquid stream of smaller size liquid particles than a smooth non-porous impactor impingement surface and without the sharp cut-off size of the latter, to improve overall separation efficiency including for smaller liquid particles. Various housing configurations and geometries are provided.

U.S. Pat. No. 7,614,390, which is hereby incorporated by reference in its entirety, discloses a two stage drainage gas-liquid separator assembly including an inertial gas-liquid impactor separator having one or more nozzles accelerating a gas-liquid stream therethrough, and an inertial impactor in the path of the accelerated gas-liquid stream and causing liquid particle separation from the gas-liquid stream. The separator assembly further includes a coalescer filter downstream of the inertial gas-liquid impactor separator and of further liquid particle separation, and coalescing separated liquid particles.

U.S. Pat. No. 7,473,291, which is hereby incorporated by reference in its entirety, discloses an inertial vas-liquid separator having a variable flow actuator movable to open and close a variable number of accelerating flow nozzles.

U.S. Pat. No. 8,075,654, which is hereby incorporated by reference in its entirety, discloses a gas-liquid separator assembly having a flow passage providing expansion of and reduced flow velocity of the post-separation gas stream, and in some embodiments provides pre-escape regions facilitating partial pre-transition of some of the flow.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A gas-liquid separator comprises a housing having an inlet for receiving a gas-liquid stream and an outlet for discharging a gas stream. An impactor nozzle structure is supported by the housing and situated downstream of the inlet, the impactor nozzle structure receiving the gas-liquid stream and accelerating the gas-liquid stream through an orifice that extends through the impactor nozzle structure. An impaction surface is supported by the housing and situated downstream of the orifice, the impaction surface receiving the accelerated gas-liquid stream and causing separation of liquid particles from the gas-liquid stream so as to produce the gas stream. A baffle is situated downstream of the impaction surface and modifies a flow of the gas stream so as to reduce carryover of liquid particles in the gas stream.

A shroud for an inertial impactor gas-liquid separator separates liquid particles from a gas-liquid stream by acceleration of the gas-liquid stream through a nozzle and towards an impaction surface so as to produce a gas stream. The shroud is configured to extend from a perimeter of the impaction surface and has a free end that extends towards the nozzle. The shroud comprises a plurality of baffles that cause the gas stream to spiral as the gas stream exits the shroud.

A method for separating liquid particles from a gas-liquid stream comprises receiving a gas-liquid stream through an inlet of a housing and accelerating the gas-liquid stream through a nozzle and at an impaction surface. The method further comprises causing separation of liquid particles from the gas-liquid stream so as to produce a gas stream. The method further comprises directing a flow of the gas stream around an impactor shroud extending from a perimeter of the impaction surface and having a free end extending towards the nozzle. The method further comprises modifying a flow of the gas stream with a baffle so as to reduce carryover of liquid particles in the gas stream and discharging the gas stream through an outlet of the housing.

BRIEF DESCRIPTION OF THE DRAWINGS

Examples of apparatuses and methods for use with a gas-liquid separator are described with reference to the following figures. These same numbers are used throughout the figures to reference like features and like components.

DETAILED DESCRIPTION

Figure 1:
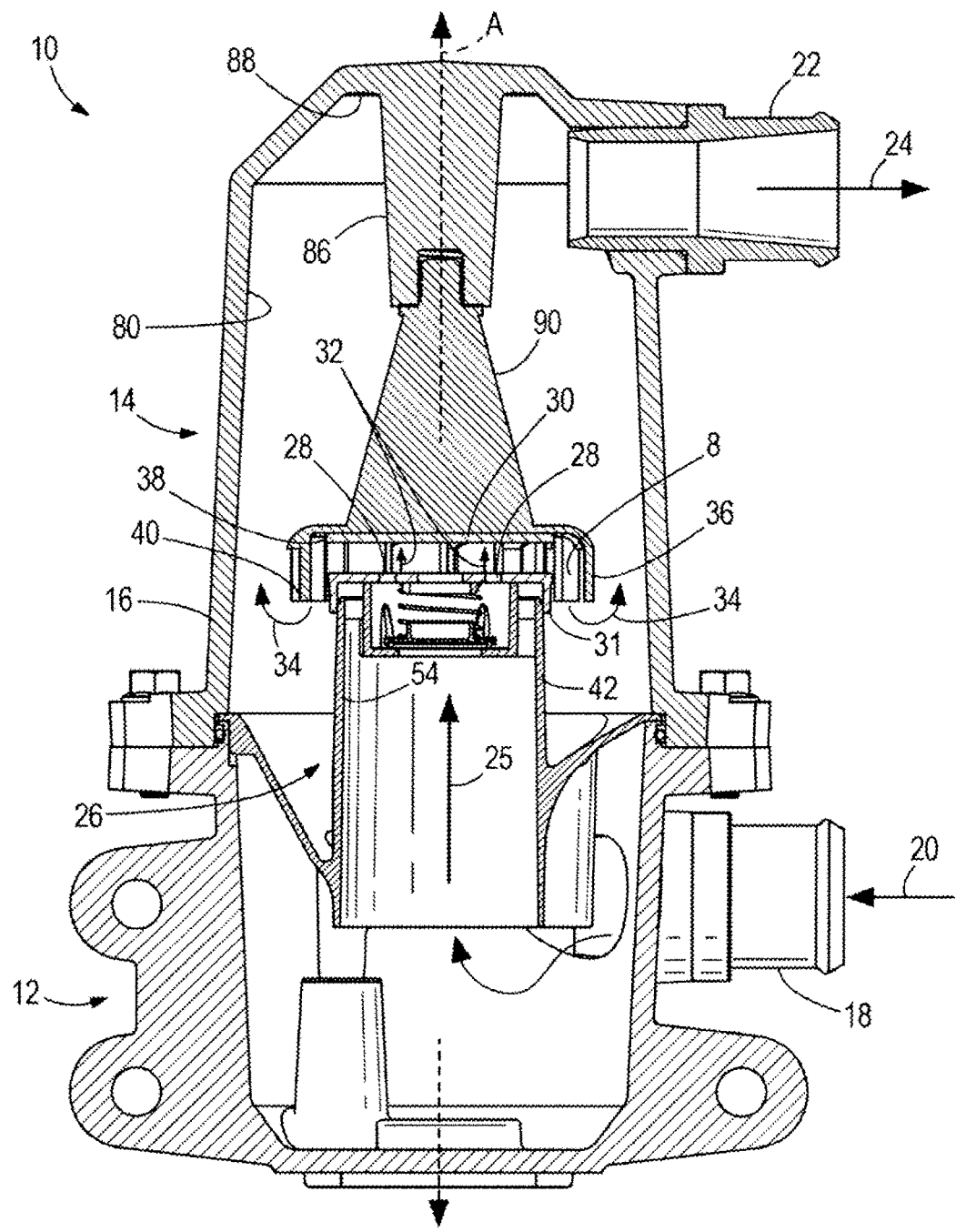
FIG. 1 illustrates one embodiment of a gas-liquid separator of the present disclosure.

FIG. 1 illustrates a gas-liquid separator 10, such as an air-oil separator. In the embodiment shown, the gas-liquid separator 10 comprises two stages: a first stage 12 comprising a cyclone separator and a second stage 14 comprising an impactor separator. However, it is to be understood that the present disclosure is not limited to two-stage gas-liquid separators and could be used with various other types of gas-liquid separators. The gas-liquid separator 10 has a housing 16 having an inlet 18 for receiving a gas-liquid stream as shown by arrow 20 and an outlet 22 for discharging a gas stream as shown by arrow 24. The gas-liquid separator 10 further comprises an impactor nozzle structure 26 supported by the housing 16 and situated downstream of the inlet 20. More specifically, in the embodiment shown, the impactor nozzle structure 26 is supported between the first stage 12 and the second stage 14 of the gas-liquid separator 10. The impactor nozzle structure 26 receives the gas-liquid stream as shown by arrow 25 and accelerates the gas-liquid stream through an orifice 28, or a plurality of orifices 28, that extend through the impactor nozzle structure 26. The gas-liquid separator 10 further comprises an impaction surface 30 supported by the housing 16 and situated downstream of the orifice 28. The impaction surface 30 receives the accelerated gas-liquid stream, as shown by arrows 32, and causes separation of liquid particles from the gas-liquid stream so as to produce the gas stream. The gas-liquid separator 10 further comprises a baffle 8, as will be described further herein below, situated downstream of the impaction surface 30 and modifying a flow of the gas stream, as shown by arrows 34, so as to reduce carryover of liquid particles in the gas stream.

Separation of the liquid particles from the gas-liquid stream occurs according to the principles and methods described in U.S. Pat. Nos. 6,290,738; 7,473,291; and 8,075,654, which were incorporated by reference herein above, and will therefore not be described further herein.

According to the present disclosure, the gas-liquid separator 10 further comprises an impactor shroud 36 that extends from a perimeter 38 of the impaction surface 30 and has a free end 40 that extends toward the impactor nozzle structure 26. Thus, the impactor shroud 36 extends generally along (parallel to) a longitudinal axis A running through the gas-liquid separator 10. The free end 40 of the impactor shroud 36 surrounds an outer surface 42 of the impactor nozzle structure 26. In the embodiment shown, both the impactor nozzle structure 26 and the impactor shroud 36 have a generally cylindrical shape, and a diameter of the impactor shroud 36 is larger than a diameter of the impactor nozzle structure 26 so as to surround the outer surface 42 of the impactor nozzle structure 26.

Figure 20:
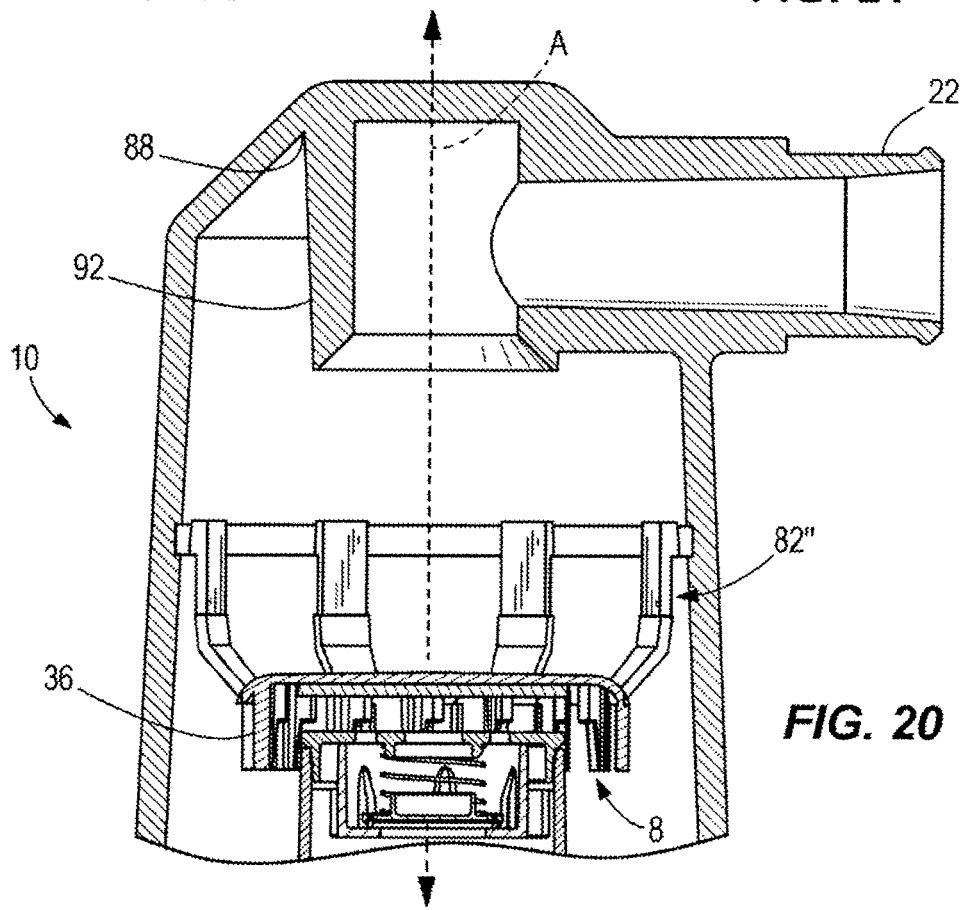
FIG. 20 illustrates an alternative embodiment of a gas-liquid separator of the present disclosure.

The impactor shroud 36 is supported by the housing 16 by a cylindrical projection 86 extending from an upper inner surface 88 of the housing 16, which cylindrical projection 86 is in turn connected to a conical portion 90, which is in turn connected to the impactor shroud 36. Alternatively, the impactor shroud 36 could be supported by the housing 16 by a stilt structure 82 (FIG. 17) or a stilt structure 82" (FIG. 20). In the embodiments shown, the impactor nozzle structure 26 comprises a cylindrical chimney 54 connected to a circular nozzle plate 31; however, it should be understood that the impactor nozzle structure 26 could take many other forms, such as a single integrated part.

Often times, high velocities within the housing 16 will cause re-entrainment of liquid particles that have been flung to an inner surface 80 of the housing 16. In other words, instead of draining from the housing 16 as described in the patents incorporated by reference hereinabove, the liquid particles that have been flung to the inner surface 80 of the housing 16 are caught in the high velocity flow of gas within the housing 16 and re-entrained into the gas flow. This reduces the efficiency of the gas-liquid separator 10, as liquid particles that have already been separated by impaction are carried over into the gas flow exiting at the outlet 22. Therefore, the present disclosure describes several embodiments of baffles 8a-8k that can be used to minimize or alleviate liquid carryover due to re-entrainment. FIGS. 2-12 show a variety of embodiments of baffles according to the present disclosure. The embodiments shown in FIGS. 2-4 normalize the flow of the gas stream (shown by arrows 34) as the gas stream exits the impactor shroud 36. The embodiments shown in FIGS. 5-12 cause the flow of the gas stream (shown by arrows 34) to spiral as the gas stream exits the impactor shroud 36. All embodiments reduce carryover of liquid particles in the gas stream as compared to an embodiment without baffle(s).

Figure 2:
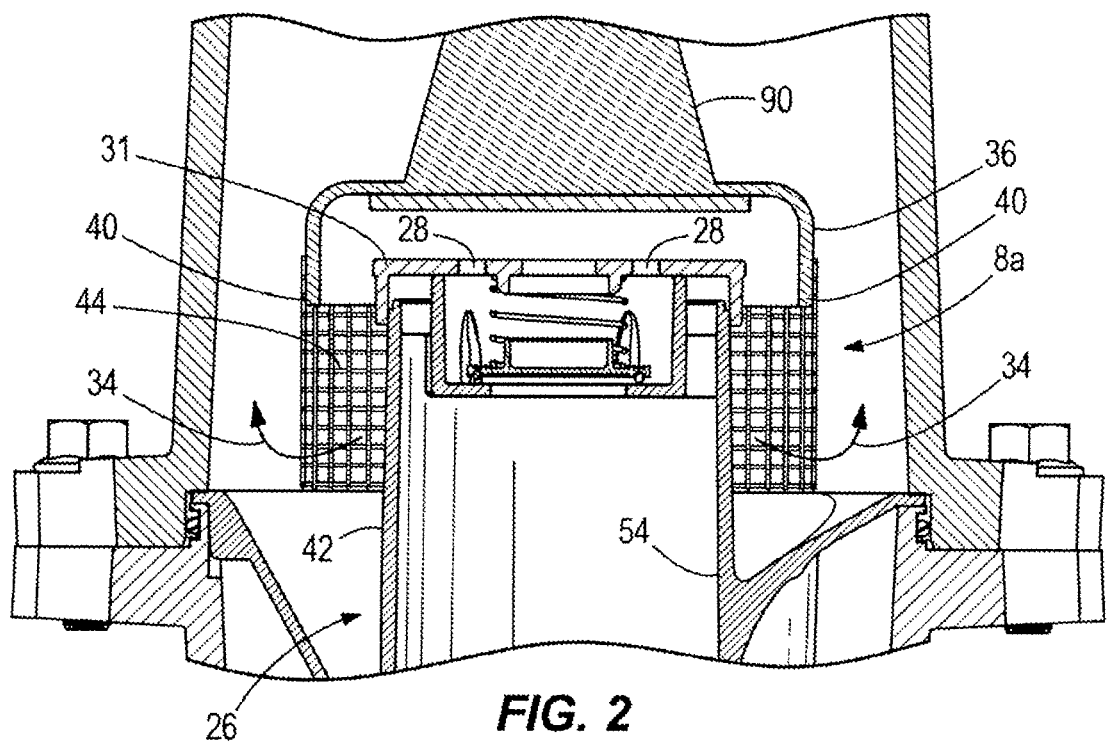
FIG. 2 illustrates one embodiment of a baffle according to the present disclosure.
Figure 3:
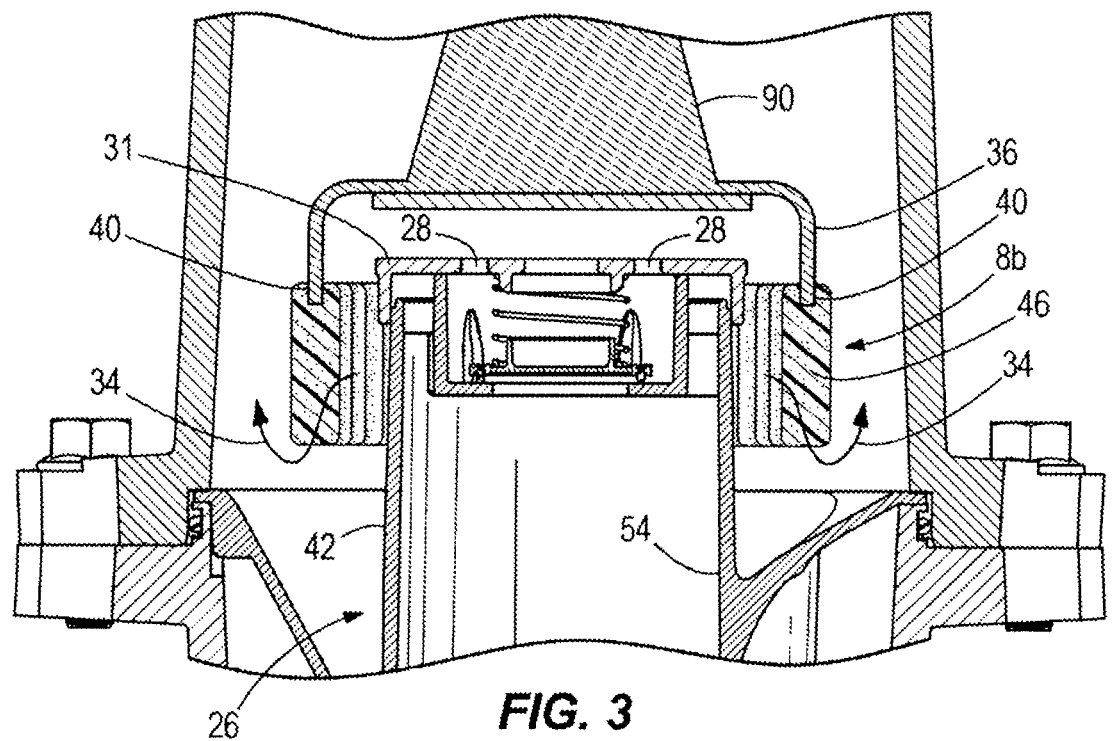
FIG. 3 illustrates another embodiment of a baffle according to the present disclosure.
Figure 4:
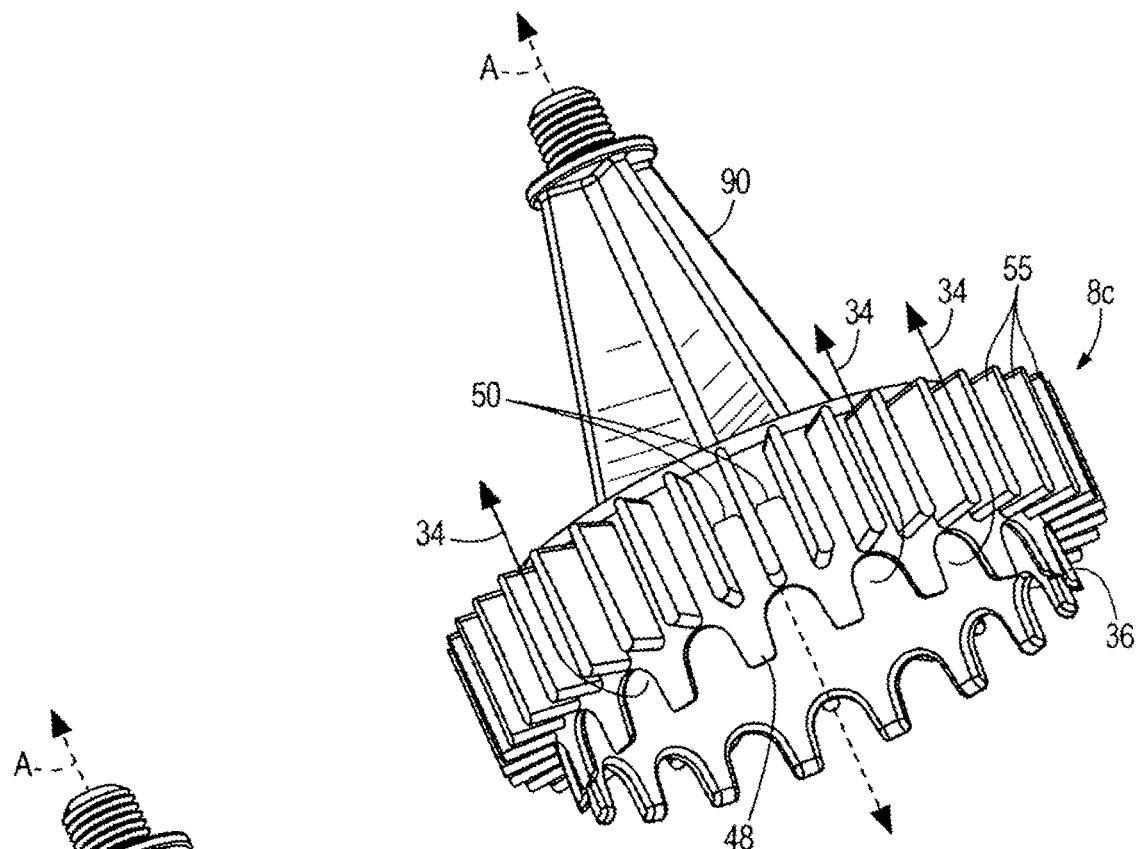
FIGS. 4-11 illustrate several other embodiments of baffles according to the present disclosure.

In the embodiments shown in FIGS. 2-4, the baffle normalizes the flow of the gas stream shown by arrows 34 as the gas stream exits the impactor shroud 36. Each of the embodiments of FIGS. 2-4 provides flow uniformity of the gas stream as shown by arrows 34 as it exits the shroud 36. Each of these embodiments allows the radially outwardly expanding jet flow of the gas stream (shown by the arrows 34) to diffuse and distribute over a wider flow area as it exits the shroud 36, to thereby reduce the jetting effect as the gas stream bends around the impactor shroud 36.

In both of the embodiments of FIGS. 2 and 3, the baffles 8a, 8b extend from the free end 40 of the impactor shroud 36. Further, the baffles 8a, 8b surround an outer surface 42 of the impactor nozzle structure 26. The baffles 8a, 8b also extend parallel to the outer surface 42 of the impactor nozzle structure 26. More specifically, the baffles 8a, 8b extend parallel to the axis A and parallel to the outer surface of the chimney 54. In the embodiment of FIG. 2, the baffle 8a comprises a mesh screen 44. The mesh screen 44 extends along the circumference of the free end 40 of the impactor shroud 36. In one example, the mesh screen 44 is designed such that its parameters produce a pressure drop coefficient of close to one. The pressure drop coefficient is adjustable based on the flow area of the mesh screen 44, and the permeability, porosity, etc. of the mesh screen 44. A perforated plate could alternatively be used instead of a mesh screen 44 to achieve the same objective. In the embodiment of FIG. 3, the baffle 8b comprises a piece of reticulated foam 46. The reticulated foam 46 extends along the circumference of the free end 40 of the impactor shroud 36.

In the embodiment of FIG. 4, the gas-liquid separator 10 further comprises a plurality of baffles 8c comprising axially-extending ribs 55 that radiate from an outer surface 48 of the impactor shroud 36. The ribs 55 extend co-axially with respect to the axis A running through the impactor shroud 36, and also radiate from axis A. In one embodiment the ribs 55 radiate from axis A at regular intervals, such as for example, shown by gaps 50 between each rib 55. In one example, the gaps 50 between each rib 55 could be less than or equal to 5 mm in order to slow and normalize the jetting flow of the gas stream (shown by the arrows 34) as it exits the impactor shroud 36. It should be understood that the ribs 55 need not be spaced at regular intervals in order to achieve the objective of the present disclosure.

Now referring to FIGS. 5-12, the embodiments shown therein comprise a plurality of baffles that cause the flow of the gas stream (shown by arrows 34) to spiral as the gas stream exits the impactor shroud 36.

Figure 5:
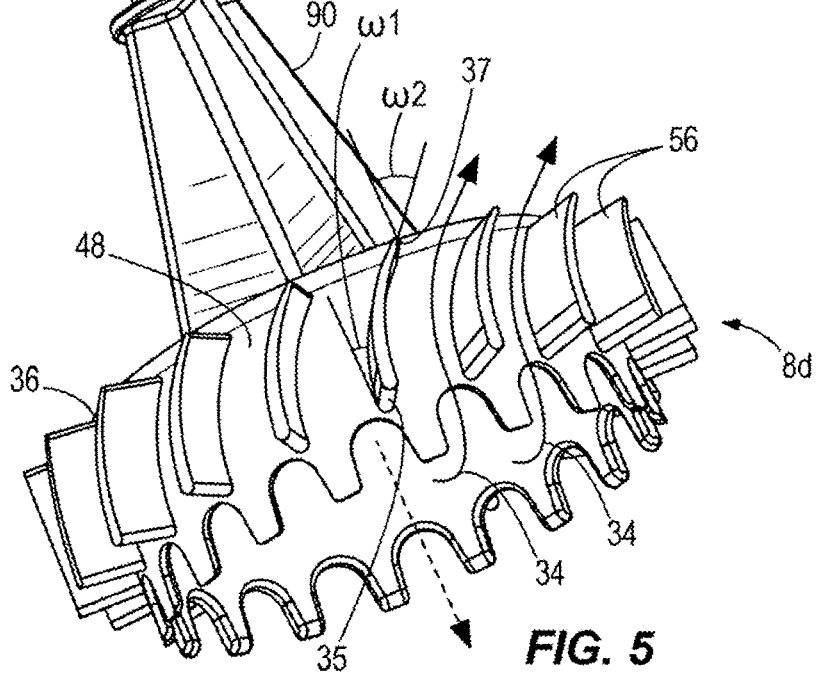

In the embodiments of FIGS. 5-8, the plurality of baffles 8d-8g project sideways (i.e., perpendicularly with respect to axis A) from a surface of the impactor shroud 36. As shown in FIG. 5, in one embodiment, the plurality of baffles 8d extend from an outer surface 48 of the impactor shroud 36. In the embodiment shown, the plurality of baffles 8d comprise ribs 56 that extend helically with respect to the outer surface 48 of the impactor shroud 36. For example, the ribs 56 extend at an angle $\omega_1$, $\omega_2$ with respect to the axis A. This angle $\omega_1$, $\omega_2$ may increase from the base 35 of the rib 56 to the tip 37 of the rib, as shown in the embodiment herein. In other words, the rib 56 may curve such that $\omega_1$, measured at the base 35, is less than $\omega_2$, measured at the tip 37. Alternatively this angle may remain the same as measured along the rib 56 from its base 35 to its tip 37, i.e. $\omega_1=\omega_2$.

Figure 6:
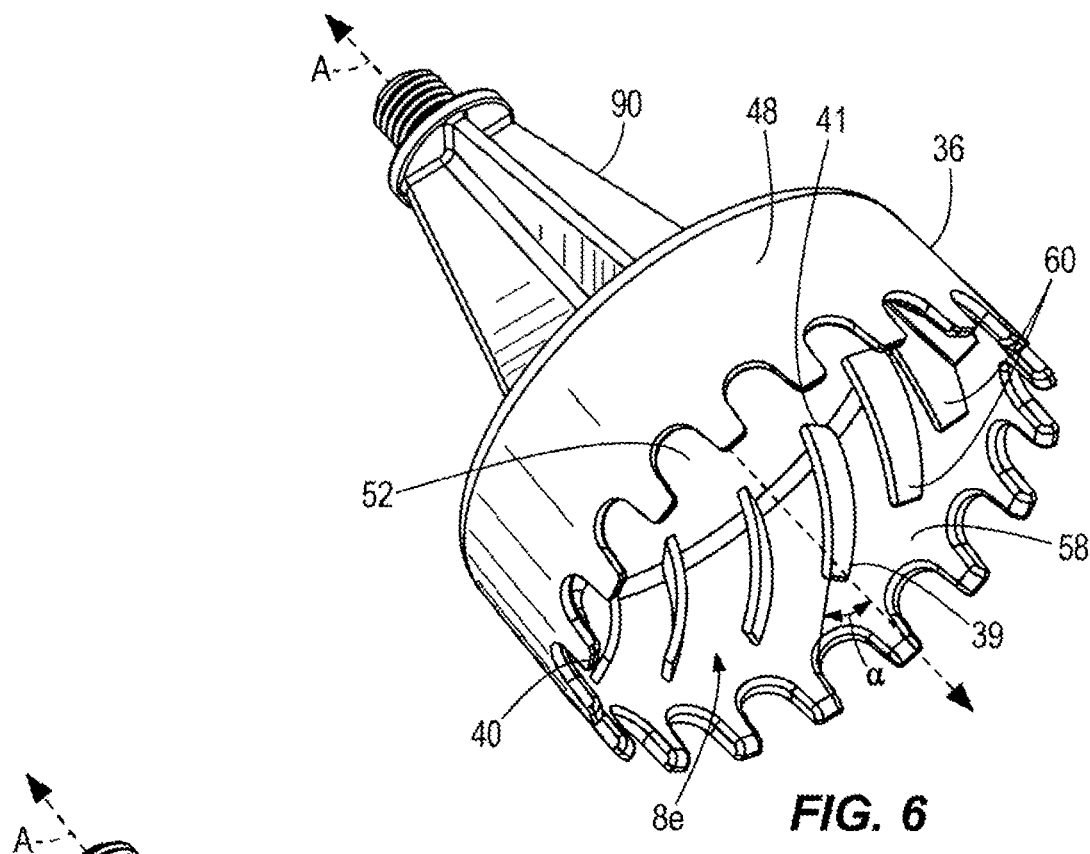
Figure 7:
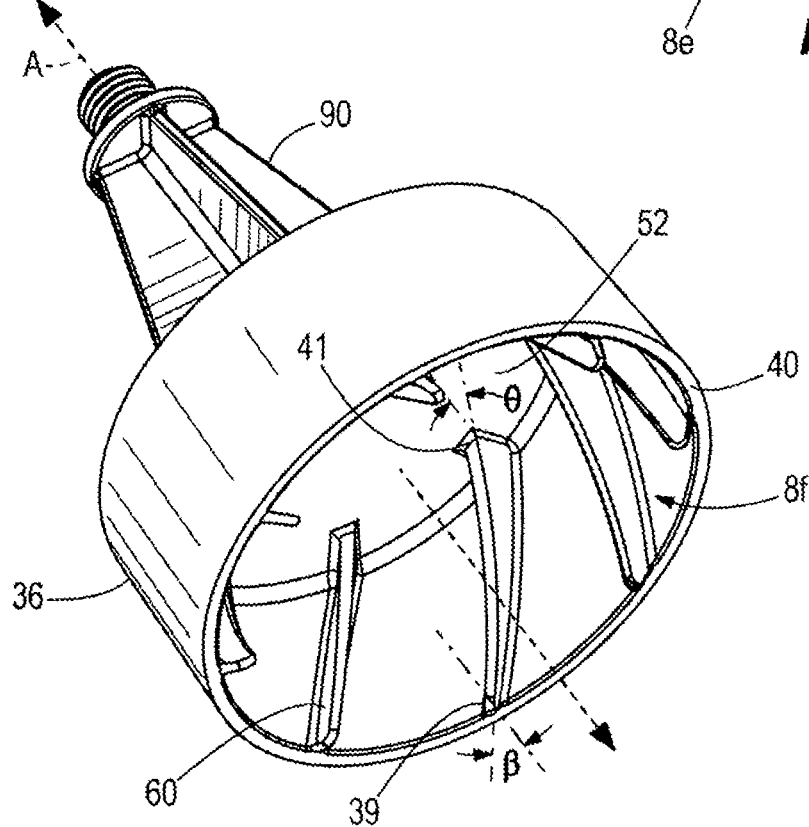
Figure 8:
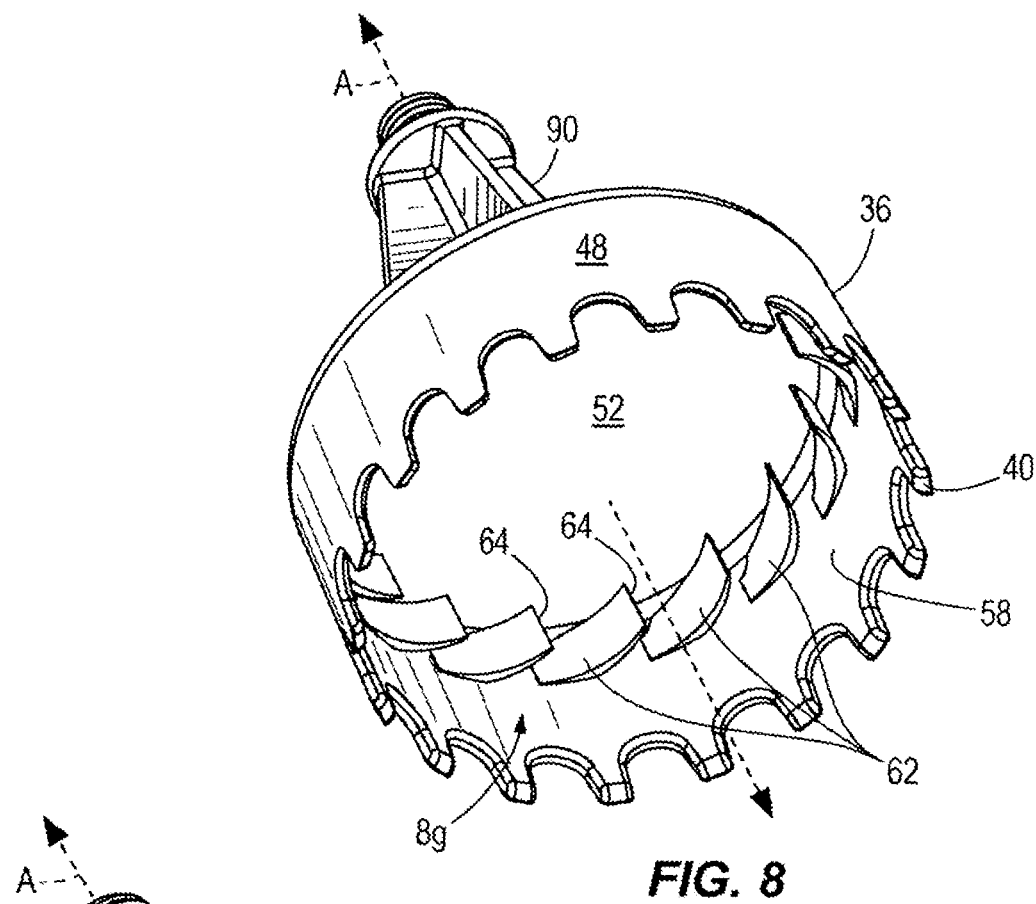

In the embodiments of FIGS. 6-8, the plurality of baffles 8e, 9f, 8g extend from an inner surface 58 of the impactor shroud 36. In the embodiments of FIGS. 6 and 7, the plurality of baffles comprise ribs 60 that extend helically with respect to the inner surface 58 of the impactor shroud 36. As can be understood from a comparison of FIGS. 6 and 7, the ribs 60 may extend all the way from an underside 52 of the shroud 36 to the free end 40 of the shroud 36 (FIG. 7), or the ribs 60 may extend front the underside 52 of the shroud 36 to a point short of the free end 40 of the shroud 36 (FIG. 6). From further comparison of FIGS. 6 and 7, it can be seen that the ribs 60 can extend at different angles α, β, θ, with respect to the axis A running through the impactor shroud 36. As described hereinabove with respect to the angles $\omega_1$ and $\omega_2$ in FIG. 5, the angles may vary from the bases 39 of the ribs 60 to the tips 41 of the ribs 60 (compare angle β with angle θ in FIG. 7). Alternatively, the angles α, β may remain the same along the ribs 60 from bases 39 to tips 41, i.e. β=θ in FIG. 7.

As shown in FIG. 8, the plurality of baffles 8g can comprise fins 62 that project radially inwardly from the inner surface 58 of the impactor shroud 36, i.e., towards the axis A. Although the fins 62 shown in FIG. 8 do not extend in the direction of axis A to the free end 40 of the impactor shroud 36, it is to be understood that the size/length of the fins 62 could vary from that shown herein. In the embodiment shown, the fins 62 each curve such that free ends 64 of the fins 62 curve into the impactor shroud 36.

Figure 9:
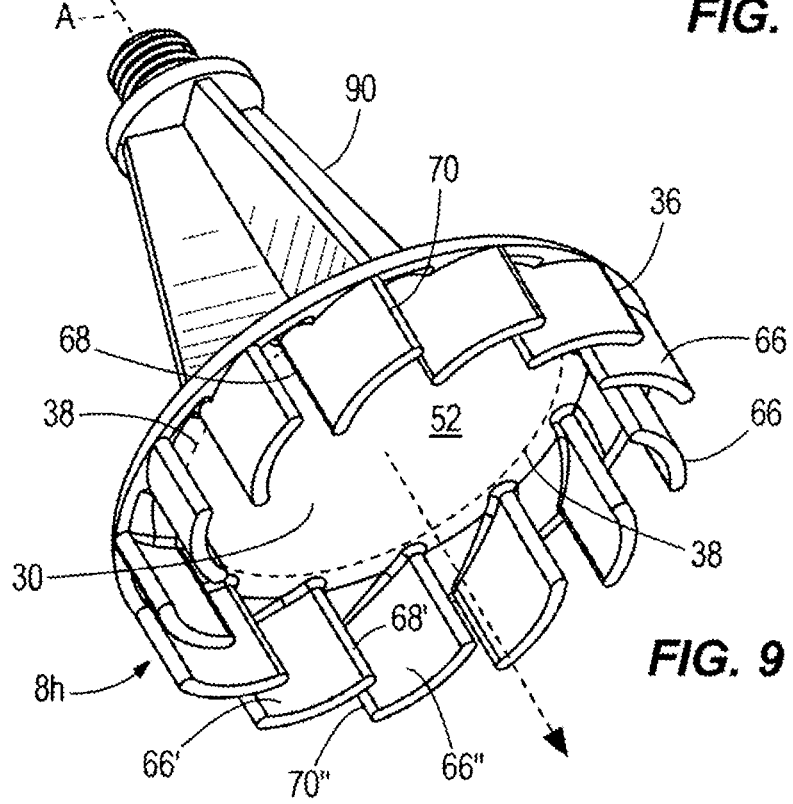
Figure 10:
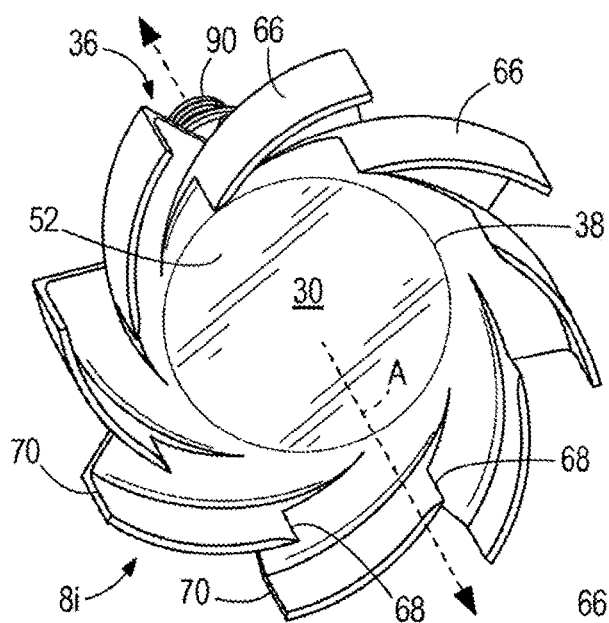
Figure 11:
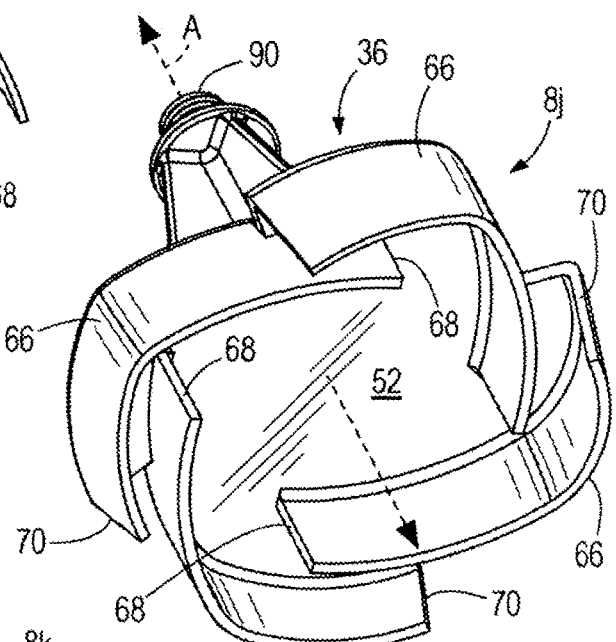

Alternatively, as shown in FIGS. 9-11, the plurality of baffles 8h-8j comprise a plurality of fins 66 projecting from an underside 52 of the impactor shroud 36 toward the impactor nozzle structure 26, i.e., projecting in the direction of axis A. In the embodiment of FIG. 9, the plurality of fins 66 spiral out from the perimeter 38 of the impaction surface 30. Each fin 66 in the plurality of fins has an inner edge 68 and an outer edge 70. In the embodiment shown, an outer edge 70 of a given fin overlaps an inner edge 68 of a fin adjacent to the given fin. For example, the fin 66" has an outer edge 70" that overlaps the inner edge 68' of an adjacent fin 66'.

The fins 66 shown in FIGS. 10 and 11 vary in shape from those shown in FIG. 9 but the description herein above regarding the fins 66 applies equally. In the embodiment of FIG. 10, the fins 66 project further radially outwardly from the perimeter 38 of the impaction surface 30 than in the embodiment of FIG. 9. In the embodiment of FIG. 11, the fins 66 project radially, but are squared off partway towards their outer edges 70. Further, the overlap between the outer edge 70 of one fin and the inner edge 68 of an adjacent fin as shown in FIG. 11 is greater than the overlap shown in FIG. 9 or 10.

Figure 12:
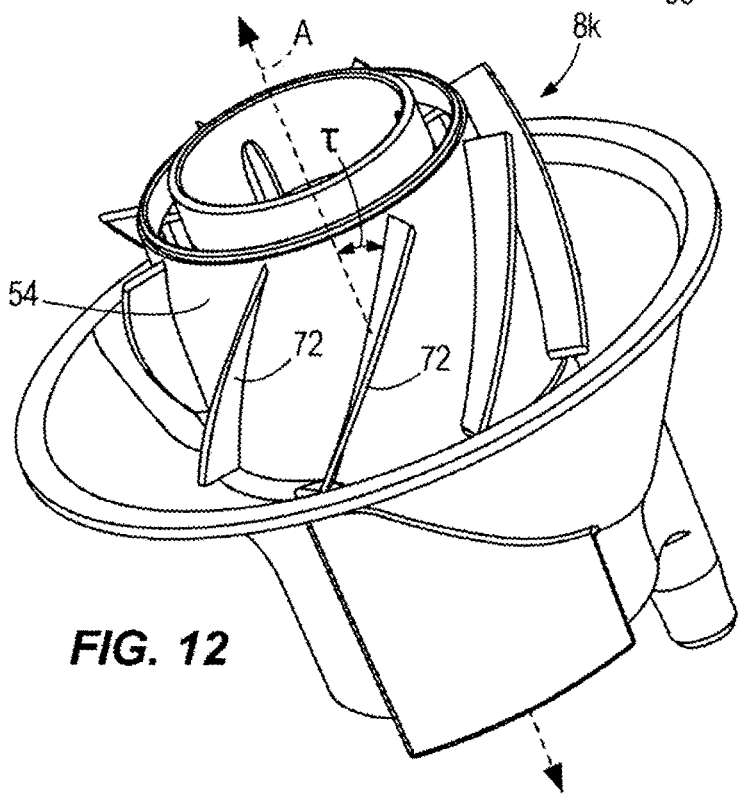
FIG. 12 illustrates an alternative embodiment of a baffle according to the present disclosure.

Alternatively, in the embodiment of FIG. 12, the impactor nozzle structure 26 comprises a chimney 54 and the plurality of baffles 8k project from an outer surface of the chimney 54. In the embodiment shown, the plurality of baffles 8k comprise ribs 72 that extend helically with respect to the outer surface of the chimney 54, i.e. at an angle τ with respect to the axis A. It should be understood that the angle at which these ribs 72 extend with respect to the axis A extending through the chimney 54 could vary.

Figure 13:
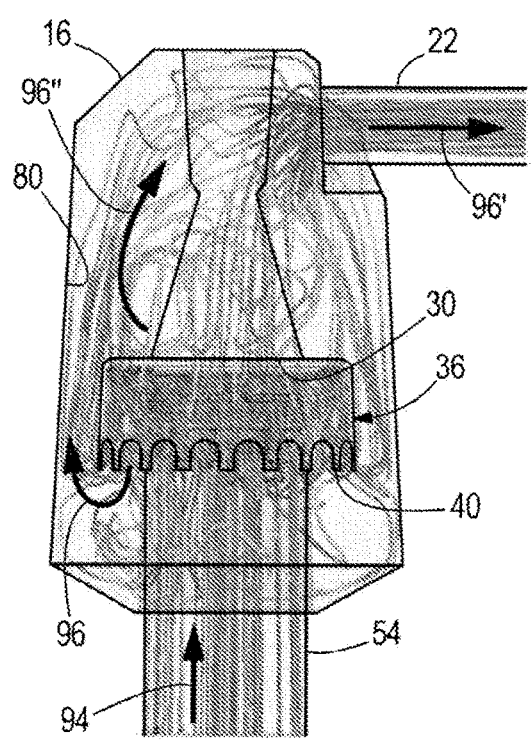
FIG. 13 is a schematic representation of a flow of a gas-liquid stream through one embodiment of a gas-liquid separator that does not have a baffle.
Figure 14:
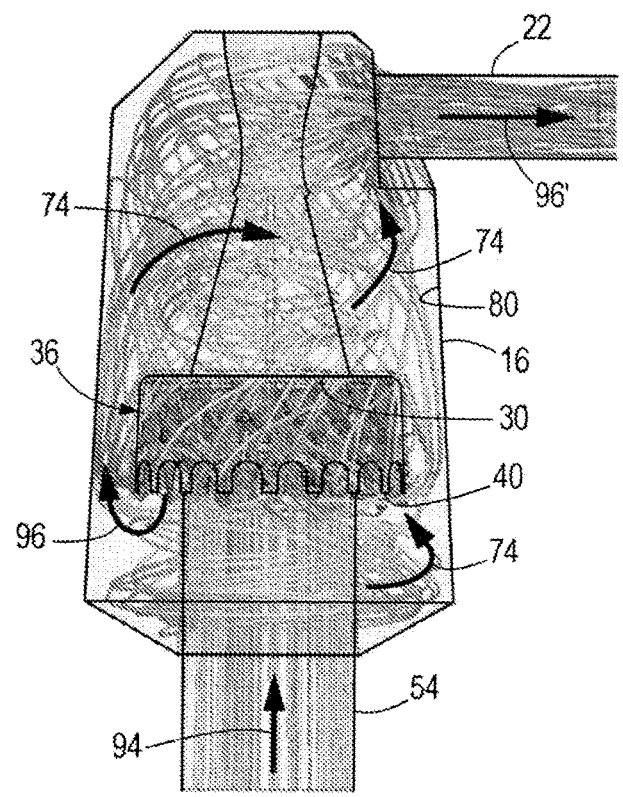
FIG. 14 is a schematic representation of a flow of a gas-liquid stream through one embodiment of a gas-liquid separator according to the present disclosure.

Now with reference to FIGS. 13-16, the spiraling effect of the baffles 8d-8k on flow in the gas-liquid separator 10 will be described. FIG. 13 shows a gas-liquid separator 10 and the flow therein (simulated by particle velocity lines) when no baffles are provided. The gas-liquid stream is shown entering through the chimney 54 at arrow 94. The gas-liquid stream hits the impaction surface 30, which causes separation of liquid particles from the gas-liquid stream. The resulting gas stream bends around the free end 40 of the impactor shroud 36, as shown by arrow 96, and exits at the outlet 22, as shown by arrow 96'. Because no baffles are provided in the embodiment of FIG. 13, the gas stream does not spiral and therefore exhibits somewhat random motion, shown by arrow 96", before it exits through outlet 2. In contrast, as shown in FIG. 14, after hitting the impaction surface 30, the gas stream exiting from the shroud 36 (shown by arrow 96) is caused to spiral as shown by arrows 74. Such spiraling of the gas stream is caused by a plurality of baffles (not shown) comprising radial ribs or fins on the impactor shroud 36 (see FIGS. 5-11) or on the chimney 54 (see FIG. 12). The flow continues to spiral throughout the housing 16 (as shown by arrows 74) until it exits at outlet 22, as shown by arrow 96'.

Figure 15:
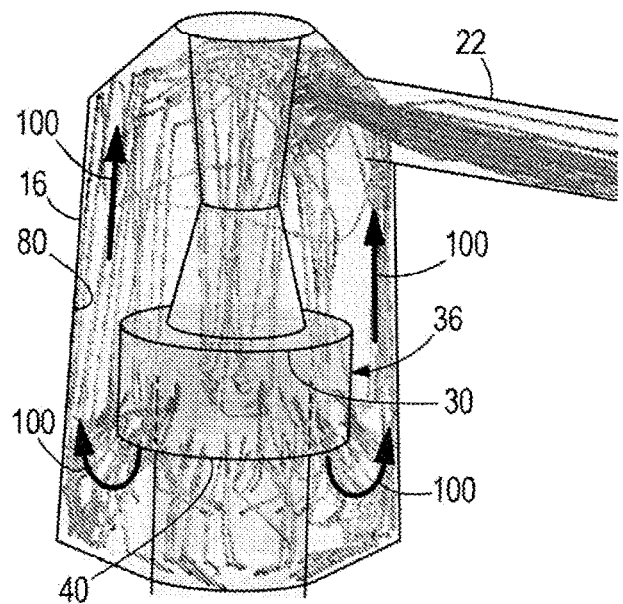
FIG. 15 is a schematic representation of a flow of liquid particles in the gas-liquid stream, corresponding to the embodiment of FIG. 13.
Figure 16:
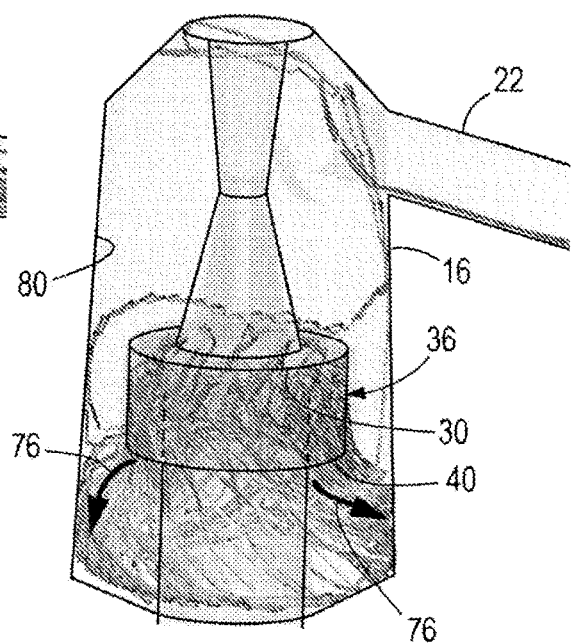
FIG. 16 is a schematic representation of a flow of liquid particles in the gas-liquid stream, corresponding to the embodiment of FIG. 14.

FIGS. 15 and 16 illustrate the effect of such spiraling flow on the liquid particle content of the flow exiting at the outlet 22. While the particle velocity lines shown in FIGS. 13 and 14 illustrate the flow of the gas or gas-liquid stream, the lines in FIGS. 15 and 16 approximate the amount of liquid particles entrained in the gas or gas-liquid stream. FIG. 15 corresponds to FIG. 13 in that no baffles are provided and therefore no spiraling flow is provided. Although liquid particles have been separated from the gas-liquid stream by hitting the impaction surface 30, liquid particles are subsequently re-entrained into the gas stream. This is because the gas stream shown bending around the free end 40 of the impactor shroud 36 exhibits high velocity jetting and contacts the inner surface 80 of the housing 16 as shown by arrows 100. At the inner surface 80 of the housing, liquid particles that have collected are re-entrained into the high-velocity gas stream. As such, many liquid particles are shown exiting at the outlet 22.

In contrast, FIG. 16 corresponds to FIG. 14 in that spiraling flow is provided by a plurality of baffles as shown and described above with respect to FIGS. 5-12. Due to the spiraling flow caused by the baffles, any liquid particles that may have been re-entrained in the gas stream are flung to the inner surface 80 of the housing 16 by centrifugal force, as shown by arrows 76. This flinging removes any liquid particles that may have been re-entrained after hitting the impaction surface 30. The flung liquid particles inertially collect on the inner surface 80 of the housing 16. The liquid particles then coalesce on the inner surface 80 of the housing 16 and drain downwards by gravity.

The baffles 8d-8k, such as ribs and fins shown in FIGS. 5-12, can be designed to optimize spiraling flow to create more effective separation of liquid particles from the gas-liquid stream. For example, the exit angle α or β at the bases 39 of the ribs 60 (as shown in FIGS. 6 and 7) could be designed to be between 30-70°. Depending on the capability of the manufacturer to create such angles and the need for post-separating cyclonic flow, these angles could be varied. An entrance angle θ at the tips 41 of the ribs 60 (see FIG. 7) could also be designed to enhance the swirling flow. Each of the embodiments mitigates re-entrainment of liquid particles via swirling flow by creating a post-separation cyclone with ribs or fins.

Figure 17:
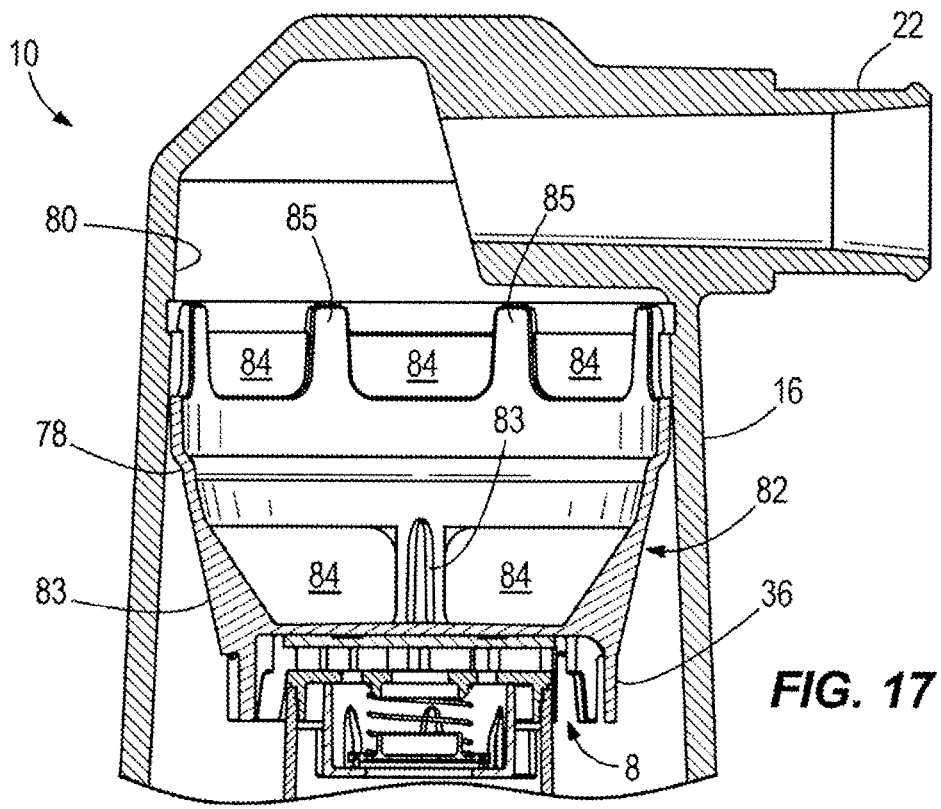
FIGS. 17 and 18 illustrate alternative embodiments of a portion of a gas-liquid separator of the present disclosure.

Now turning to FIGS. 17 and 18, further embodiments of a gas-liquid separator 10 of the present disclosure will be described. In these embodiments, the gas-liquid separator 10 further comprises a ring 78, 78' projecting radially inwardly from an inner circumferential surface 80 of the housing 16 downstream of the plurality of baffles 8. It is to be understood that the baffle(s) could comprise any of the baffles 8a-8k shown in FIGS. 2-12. In the embodiment shown in FIG. 17, the ring 78 is attached to the impactor shroud 36 by a stilt structure 82. The stilt structure 82 comprises a plurality of lower stilts 83 and a plurality of upper stilts 85. In one embodiment, the lower stilts 83 are connected to the shroud 36 at regular intervals around a circumference the shroud 36, while the upper stilts 85 are connected to the inner surface 80 of the housing 16 at regular intervals around a circumference of the inner surface 80 of the housing 16. The stilt structure 82 allows for flow therethrough via gaps 84 between each of the upper stilts 85 and each of the lower stilts 83. The stilt structure 82 holds the impactor shroud 36 in place within the housing 16.

Figure 18:
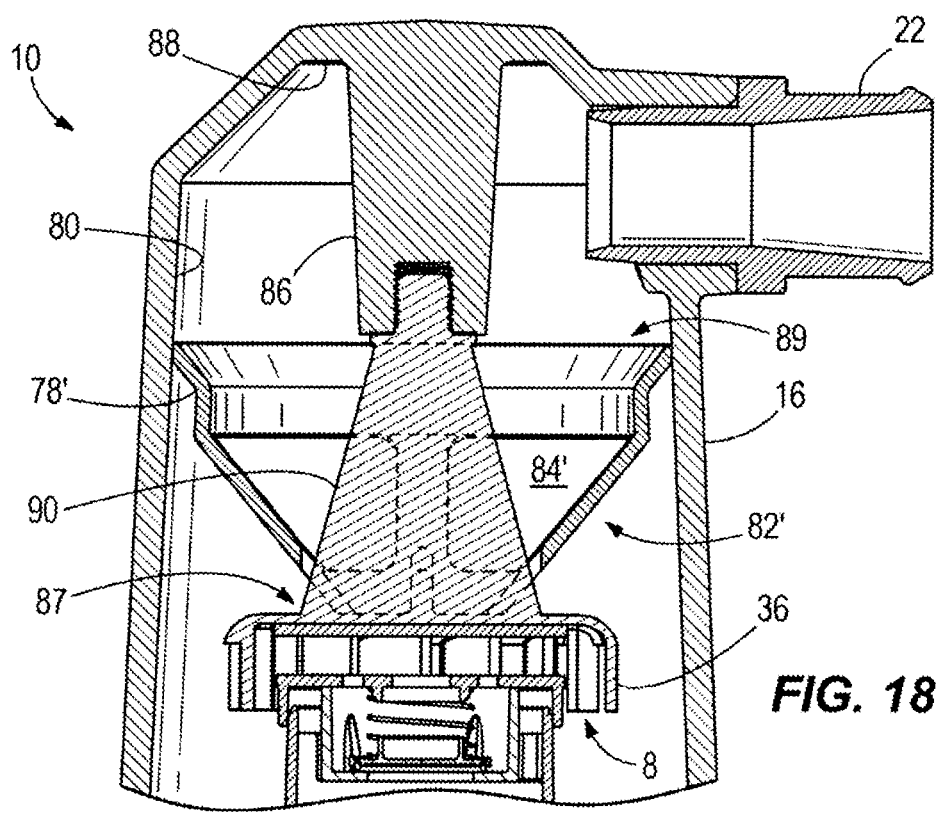

In contrast, in FIG. 18, the impactor shroud 36 is held within the housing 16 by a cylindrical projection 86 extending from an upper inner surface 88 of the housing 16. The projection 86 is coupled to a conical portion 90, which is coupled to the impactor shroud 36. Although the conical portion 90 is shown integrally molded to the impactor shroud 36, the parts could be connected in various other ways. Similarly, although the conical portion 90 is shown connected to the cylindrical portion 86 by a threaded connection, the parts could be connected in various other ways. The ring 78' is coupled to the impactor shroud 36 by a stilt structure 82' having gaps 84' that allow for how therethrough. The stilt structure 82' comprises a truncated cone, one end 87 of which has a smaller diameter and is coupled to the shroud 36, and the other end 89 of which has a larger diameter and is coupled to the circumference of the inner surface 80 of the housing 16.

Figure 19:
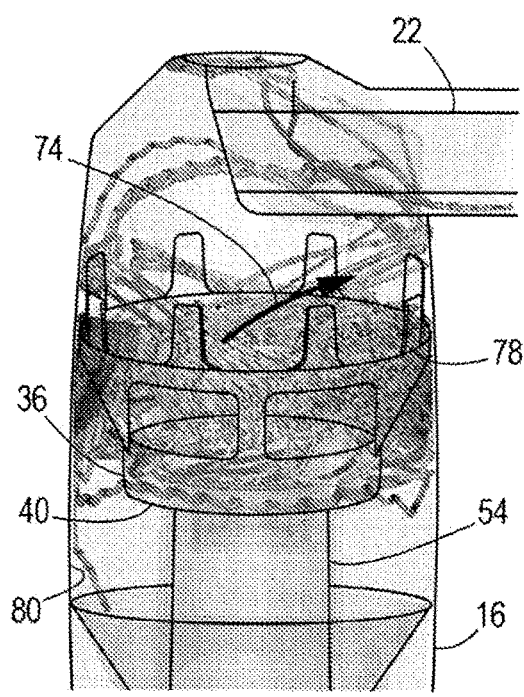
FIG. 19 is a schematic representation of a flow of liquid particles in a gas-liquid stream according to the embodiments of FIG. 17 or 18.

The ring 78, 78', known as a "vortex finder ring", ensures that larger re-entrained liquid particles are caught on the ring 78, 78' and do not exit via the outlet 22. The effect of the ring 78, 78' is shown in FIG. 19, which shows an approximation of the amount of liquid particles in the flow through the housing 16. After exiting the free end 40 of the impactor shroud 36, the spiraling flow shown by arrow 74 is stopped by the ring 78, which causes liquid particles to be flung to the inner surface 80 of the housing 16, thereby reducing the number of liquid particles exiting at the outlet 22. Liquid particles that are caught on the ring 78 are collected on the inner surface 80 of the housing 16 and drain downward by gravity. Although FIG. 19 shows the ring 78 according to the embodiment of FIG. 17, it should be understood that the ring 78' of FIG. 18 also causes the swirling flow to stop, thereby causing liquid particles to be flung to the inner surface 80 of the housing 16.

Figure 21:
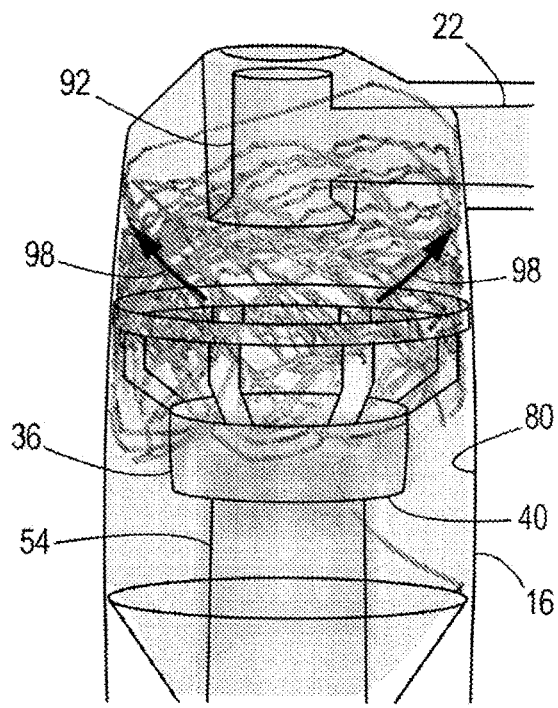
FIG. 21 is a schematic representation of a flow of liquid particles in a gas-liquid stream according to the embodiment of FIG. 20.

In another embodiment, as shown in FIG. 20, the gas-liquid separator 10 comprises an outlet shroud 92 extending axially inwardly (i.e., into the housing along axis A) from the upper inner surface 88 of the housing 16 downstream of the plurality of baffles 8. In the embodiment shown, the outlet shroud 92 comprises an axially projecting cylindrical tube that extends perpendicularly with respect to the tube comprising the outlet 22 of the gas-liquid separator 10. As shown in FIG. 21, which approximates the amount of liquid particles in the flow through the housing 16, liquid particles collect along the inner surface 80 of the housing 16 as shown by arrows 98 and the gas stream proceeds through the outlet shroud 92 with fewer liquid particles than would otherwise be entrained were there no outlet shroud 92. This is because the alignment of the outlet shroud 92 (i.e., the outlet shroud 92 being axially aligned with flow through the housing 16) causes cyclonic flow within the housing 16, which flings particles to the inner surface 80 of the housing 16.

Disclosed herein is a shroud 36 for an inertial impactor gas-liquid separator 10 that separates liquid particles from a gas-liquid stream by acceleration of the gas-liquid stream through a nozzle, such as orifice(s) 28, and towards an impaction surface 30 so as to produce a gas stream. The shroud 36 is configured to extend from a perimeter 38 of the impaction surface 30 and has a free end 40 that extends toward the nozzle, such as orifice(s) 28. In some embodiments, the shroud 36 comprises a plurality of baffles 8d-8k that cause the gas stream to spiral as the gas stream exits the shroud 36, such as shown in FIGS. 5-12. In some embodiments, the plurality of baffles 8d-8g project sideways from a surface of the shroud 36, such as is shown in FIGS. 5-8.

In one embodiment, such as shown in FIG. 5, the plurality of baffles 8d project from an outer surface 48 of the shroud 36. The plurality of baffles 8d comprise ribs 56 that extend helically with respect to the outer surface 48 of the shroud 36.

In the embodiments shown in FIGS. 6-8, the plurality of baffles 8e-8g project from an inner surface 58 of the shroud 36. As shown in FIGS. 6 and 7, the plurality of baffles 8e, 8f comprise ribs 60 that extend helically with respect to the inner surface 58 of the shroud 36. In the embodiment shown in FIG. 8, the plurality of baffles 8g comprise fins 62 that project radially inwardly from the inner surface 58 of the shroud 36. The fins 62 curve such that free ends 64 of the fins 62 curve into the shroud 36.

As shown in FIGS. 9-11, the plurality of baffles 8h-8j can comprise a plurality of fins 66 projecting from an underside 52 of the shroud 36. The plurality of fins 66 spiral out from the perimeter 38 of the impaction surface 30. Each fin 66 in the plurality of fins has an inner edge 68 and an outer edge 70, wherein an outer edge 70 of a given fin overlaps an inner edge 68 of a fin adjacent the given fin.

Figure 22:
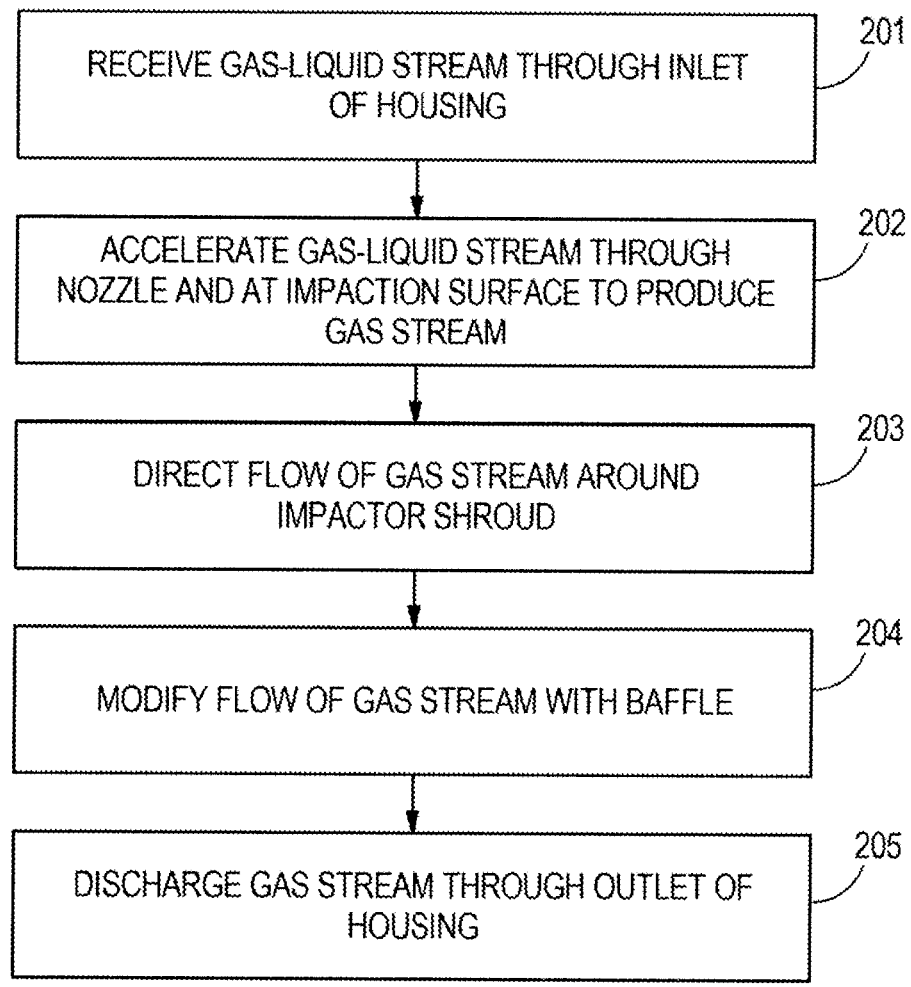
FIG. 22 illustrates one embodiment of a method for separating liquid particles from a gas-liquid stream.

Now referring to FIG. 22, the present disclosure also includes a method for separating liquid particles from a gas-liquid stream. The method comprises receiving a gas-liquid stream through an inlet 18 of a housing 16, as shown at box 201. The method includes accelerating the gas-liquid stream through a nozzle, such as orifice(s) 28, and at an impaction surface 30, causing separation of liquid particles from the gas-liquid stream so as to produce a gas stream, as shown at box 202. The method includes directing a flow of the gas stream around an impactor shroud 36 extending from a perimeter 38 of the impaction surface 30 and having a free end 40 extending towards the nozzle, such as orifice(s) 28, as shown at box 203. The method includes modifying a flow of the gas stream with a baffle 8a-8k so as to reduce carryover of liquid particles in the gas stream, as shown at box 204. The method includes discharging the gas stream through an outlet 22 of the housing 16, as shown at box 205.

The method may further comprise normalizing the flow of the gas stream as the gas stream exits the impactor shroud 36. This accomplished by way of the apparatuses shown in the embodiments of FIGS. 2-4. For example, the method may include passing the gas stream through a mesh screen 44 coupled to the free end 40 of the impactor shroud 36 so as to normalize the flow of the gas stream. The method may alternatively comprise passing the gas stream through a piece of reticulated foam 46 coupled to the free end 40 of the impactor shroud. 36 so as to normalize the flow of the gas stream. The method may alternatively comprise passing the gas stream through small gaps 50 between baffles 8c comprising axially-extending ribs 55 that radiate from an outer surface 48 of the impactor shroud 36.

In alternative embodiments, the method may further comprise causing the flow of the gas stream 34 to spiral as the gas stream exits the impactor shroud 36. This is shown in the embodiments of FIGS. 5-12. In one example shown in FIG. 5, the method further comprises directing the gas stream through a plurality of baffles 8d comprising ribs 56 that extend helically with respect to an outer surface 48 of the impactor shroud 36. As shown in FIGS. 6 and 7, the method may further comprise directing the gas stream through a plurality of baffles 8e, 8f comprising ribs 60 that extend helically with respect to an inner surface 58 of the impactor shroud 36. As shown in FIG. 8, the method may further comprise directing the gas stream through a plurality of baffles 8g comprising fins 62 that extend radially inwardly from an inner surface 58 of the impactor shroud 36. As shown in FIGS. 9-11, the method may further comprise directing the gas stream through a plurality of baffles 8h, 8i, 8j comprising fins 66 projecting from an underside 52 of the impactor shroud 36 towards the impactor nozzle, such as orifice(s) 28.

In the above description certain terms have been used for brevity, clarity, and understanding. No unnecessary limitations are to be inferred therefrom beyond the requirement of the prior art because such terms are used for descriptive purposes and are intended to be broadly construed. The different apparatuses and methods described herein above may be used in alone or in combination with other apparatuses and methods. Various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation. While each of the method claims includes a specific series of steps for accomplishing the method, the scope of this disclosure is not intended to be bound by the literal order or literal content of steps described herein, and non-substantial differences or changes still fall within the scope of the disclosure.

What is claimed is:

1. An inertial impactor gas-liquid separator that separates liquid particles from a gas-liquid stream by acceleration of the gas-liquid stream through a nozzle and towards an impaction surface so as to produce a gas stream, comprising:
- the nozzle;
- the impaction surface;
- a shroud extending from a perimeter of the impaction surface and having a free end that extends towards the nozzle, the shroud comprising a plurality of baffles that cause the gas stream to spiral as the gas stream exits the free end of the shroud;
- a radially inwardly projecting ring, the radially inwardly ring downstream of the plurality of baffles, the ring configured to impede the spiral gas stream from the shroud and capture liquid particles from the gas-liquid stream; and
- a stilt structure comprising a plurality of upper stilts and a plurality of lower stilts, the ring positioned between the plurality of upper stilts and the plurality of lower stilts, the plurality of lower stilts attaching the ring to the shroud, wherein the plurality of lower stilts are configured so as to allow for flow of the spiral gas stream from outside the stilt structure to internal the stilt structure therethrough via gaps between each of plurality of lower stilts and the ring.

2. The inertial impactor gas-liquid seperator of claim 1, wherein the plurality of baffles project sideways from a surface of the shroud.

3. The inertial impactor gas-liquid seperator of claim 2, wherein the plurality of baffles project from an outer surface of the shroud.

4. The inertial impactor gas-liquid seperator of claim 3, wherein the plurality of baffles comprise ribs that extend helically with respect to the outer surface of the shroud.

5. The inertial impactor gas-liquid seperator of claim 1, wherein the plurality of baffles project from an inner surface of the shroud.

6. The inertial impactor gas-liquid seperator of claim 5, wherein the plurality of baffles comprise fins that project radially inwardly from the inner surface of the shroud.

7. The inertial impactor gas-liquid seperator of claim 6, wherein the fins curve such that free ends of the fins curve into the shroud.

8. The inertial impactor gas-liquid seperator of claim 5, wherein the plurality of baffles comprise ribs that extend helically with respect to the inner surface of the shroud.

9. The inertial impactor gas-liquid seperator of claim 1, wherein the plurality of baffles comprise a plurality of fins projecting from an underside of the shroud.

10. The inertial impactor gas-liquid seperator of claim 9, wherein the plurality of fins spiral out from the perimeter of the impaction surface.

11. The inertial impactor gas-liquid seperator of claim 10, wherein each fin in the plurality of fins has an inner edge and an outer edge, and wherein an outer edge of a given fin overlaps an inner edge of a fin adjacent to the given fin.

12. The inertial impactor gas-liquid seperator of claim 1, wherein the plurality of lower stilts are connected to an upper portion of the shroud at regular intervals around a circumference thereof.

13. The inertial impactor gas-liquid seperator of claim 1, wherein the plurality of upper stilts are configured to connect to an inner surface of a housing within which the shroud is positioned, the plurality of upper stilts positioned at regular intervals around a circumference of the inner surface of the housing.

14. The inertial impactor gas-liquid seperator of claim 1, wherein the plurality of upper stilts is configured so as to allow for flow therethrough via gaps between each of the plurality of upper stilts and the ring.

15. The inertial impactor gas-liquid seperator of claim 1, wherein the stilt structure is configured to hold the shroud in place within a housing within which the shroud is positioned.

16. The inertial impactor gas-liquid seperator of claim 1, wherein the plurality of lower stilts are connected to an upper portion of the shroud at regular intervals around a circumference thereof, and wherein the plurality of upper stilts are configured to connect to an inner surface of a housing within which the shroud is positioned, the plurality of upper stilts positioned at regular intervals around a circumference of the inner surface of the housing.

\* \* \* \* \*